US008538982B2

(12) United States Patent
Effrat et al.

(10) Patent No.: US 8,538,982 B2
(45) Date of Patent: Sep. 17, 2013

(54) FRAMEWORK FOR SELECTING AND PRESENTING ANSWER BOXES RELEVANT TO USER INPUT AS QUERY SUGGESTIONS

(75) Inventors: Jonathan J. Effrat, Mountain View, CA (US); David E. Lecomte, Zurich (CH); Christina R. Dhanaraj, Sunnyvale, CA (US); Othar Hansson, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/873,246

(22) Filed: Aug. 31, 2010

(65) Prior Publication Data

US 2011/0055189 A1 Mar. 3, 2011

Related U.S. Application Data

(60) Provisional application No. 61/238,582, filed on Aug. 31, 2009.

(51) Int. Cl.
*G06F 17/30* (2006.01)
(52) U.S. Cl.
CPC .................. *G06F 17/30442* (2013.01)
USPC ............. 707/769; 707/723; 707/749
(58) Field of Classification Search
CPC ................................................ G06F 17/30442
USPC ................ 707/749, 769, 706, 802, 803, 723, 707/765
See application file for complete search history.

(56) References Cited

U.S. PATENT DOCUMENTS

| 7,047,242 B1 | 5/2006 | Ponte |
| 2005/0076019 A1 | 4/2005 | Jackson et al. |
| 2005/0283468 A1 | 12/2005 | Kamvar et al. |
| 2006/0217953 A1 | 9/2006 | Parikh |
| 2006/0248078 A1 | 11/2006 | Gross et al. |
| 2007/0061317 A1 | 3/2007 | Ramer et al. |
| 2007/0162422 A1 | 7/2007 | Djabarov |
| 2007/0162481 A1 | 7/2007 | Millett |
| 2008/0109401 A1 | 5/2008 | Sareen et al. |
| 2008/0140519 A1 | 6/2008 | Thiesson et al. |
| 2009/0094145 A1 | 4/2009 | Kim et al. |
| 2009/0094211 A1 | 4/2009 | Marvit et al. |
| 2009/0119289 A1 | 5/2009 | Gibbs et al. |
| 2009/0171929 A1 | 7/2009 | Jing et al. |
| 2009/0287680 A1 | 11/2009 | Paek et al. |
| 2009/0327235 A1 | 12/2009 | Coladonato et al. |
| 2010/0228710 A1 | 9/2010 | Imig et al. |

(Continued)

OTHER PUBLICATIONS

International Search Report and Written Opinion; PCT/US2010/047409; Mar. 15, 2012; 15 pages.

(Continued)

*Primary Examiner* — Shahid Alam
(74) *Attorney, Agent, or Firm* — Fish & Richardson P.C.

(57) ABSTRACT

Methods, systems, and apparatus, including computer programs encoded on computer storage media, for identifying answer boxes for presentation to a user. In general, one aspect of the subject matter described in this specification can be embodied in methods that include the actions of, while receiving an input entered in a search engine query input field by a first user, and before the first user has submitted the input as a search request, obtaining content for an answer box for the input and presenting the answer box to the first user. The answer box can be an answer box associated with a dominant query for the input, or can be an answer box identified from historical answer box data for the input.

30 Claims, 13 Drawing Sheets

(56) References Cited

U.S. PATENT DOCUMENTS

2010/0306228 A1 12/2010 Carpenter et al.
2011/0060984 A1 3/2011 Lee
2011/0258035 A1 10/2011 Oren et al.
2011/0264537 A1 10/2011 Kwon et al.

OTHER PUBLICATIONS

Bast, Holger; "Type Less, Find More: Fast Autocompletion Search With a Succinct Index;" Proceedings of the 29th Annual International ACM Sigir Conference on Research and Development in Information Retrieval; Seattle Washington, Aug. 6-11, 2006; pp. 364-371.
Li, Guoliang; "Efficient Type-Ahead Search on Relational Data: a TASTIER Approach;" Proceedings of the 35th Sigmod International Conference on Management of Data; Providence, Rhode Island, Jun. 29-Jul. 2, 2009, pp. 695-706.
White, Ryen W.; "Studying the Use of Popular Destinations to Enhance Web Search Interaction;" Proceedings of 30th Annual International ACM Sigir Conference on Research and Development in Information Retrieval; Amsterdam, The Netherlands, Jul. 23-27, 2007, pp. 159-166.
Invitation to Pay Additional Fees and, Where Applicable, Protest Fee and Partial International Search for International Application No. PCT/US2010/047409; dated Jan. 19, 2011; 9 pages.
International Search Report and Written Opinion for Application No. PCTUS2010047409; dated Jul. 7, 2011, 23 pages.
"Google Suggests Search Destinations" TechWeb. Dec. 10, 2004 [recovered from ProQuest on Mar. 15, 2013], 1 page.

646 slumd slumdog millionaire
slumdog millionaire showtimes
slumdog millionaire trailer
slumdog millionaire wiki
slumdog millionaire soundtrack
slumdog millionaire review
Slumdog Millionaire showtimes for San Francisco, CA
644 — AMC Van Ness 14 – 1:30 4:20 7:15 9:55pm
Sundance Kabuki Cinemas – 2:10 4:10 4:45 7:10 8:00 9:50pm ...
www.example.com Search

FIG. 6K

650 amc merc amc mercado
amc mercado movie times
amc mercado 20 santa clara
amc merchants crossing 16
amc merchants crossing
Showtimes for San Francisco, CA
He's Just Not That Into You ★★★★☆ – 3:10 5:30 8:00 10:15pm
648 — Slumdog Millionaire ★★★★★ – 2:45 5:00 7:20 9:45pm
Pink Panther ★★★☆☆ – 3:30 4:55 7:10 10:05pm
www.example.com Search

FIG. 6L

662 red so

660

Boston Red Sox (69-51)
Last game: Aug 20, Boston Red Sox 8 - Toronto Blue Jays 1
Next game: vs. New York Yankees, Aug 21 7:10pm ET
www.example.com
red sox
red sox schedule
red sox spring training
red sox rumors
red sox new logo
red sox roster

Search

FIG. 6O

FRAMEWORK FOR SELECTING AND PRESENTING ANSWER BOXES RELEVANT TO USER INPUT AS QUERY SUGGESTIONS

CROSS-REFERENCE TO RELATED APPLICATIONS

This application claims priority to U.S. Provisional Application Ser. No. 61/238,582, filed Aug. 31, 2009. The disclosure of the prior application is considered part of and is incorporated by reference in the disclosure of this application.

BACKGROUND

This specification relates to providing information relevant to user search queries.

Internet search engines identify resources, e.g., Web pages, images, text documents, and multimedia content, in response to queries submitted by users and present information about the resources in a manner that is useful to the users.

Users of search engines are often looking for an answer to a specific question, rather than a listing of resources. For example, users may want to know what the weather is in a particular location, what the definition of a particular word is, how to convert between two time zones, or the product of multiplying two numbers.

An answer box is a formatted presentation of content that is relevant to the query. For example, if the user's query refers to weather in a particular location, the answer box can include a forecast of weather in the particular location. An answer box has a category that is one of a predefined group of categories, and is formatted according to a template specific to its category. An answer box can also be associated with code that defines how content for the answer box is obtained. The code can be, for example, scripts or code identifying a back end server from which the content is received.

Some search engines present an answer box in response to a query when the search engines determine that both the category of the answer box, and the content of the answer box, are relevant to the search query. However, these search engines require a user either to enter a specific, complete phrase that triggers the answer box, or to explicitly submit a search request to the search engine, before an answer box is presented.

SUMMARY

This specification describes technologies relating to presenting answer boxes as query suggestions.

In general, one aspect of the subject matter described in this specification can be embodied in methods that include the actions of while receiving a first text input entered in a search engine query input field by a first user, and before the first user has submitted the first text input as a search request, deriving, in a data processing system, a first dominant query from the first text input; obtaining, by the system, content for a first answer box associated with the first dominant query; and presenting the first answer box to the first user. Other embodiments of this aspect include corresponding systems, apparatus, and computer programs recorded on computer storage devices, each configured to perform the operations of the methods.

These and other embodiments can each optionally include one or more of the following features. The first dominant query can be different from the first text input. The first dominant query can be a completion of the first text input.

Identifying the first dominant query can include receiving a group of queries including one or more query suggestions for the first text input; determining a popularity value for each query in the group of queries, the popularity value for each query being derived from a number of times one or more users submitted the query suggestion; and identifying a selected query from the one or more queries as the first dominant query, the selected query having a popularity value that exceeds a threshold. The group of queries can further include the first text input. The popularity value for each query can be a number of times one or more users submitted a search for the query suggestion divided by the total number of times the one or more users submitted a search for each query suggestion in the plurality of query suggestions. The popularity value for each query can be the number of times one or more users submitted a search for the query suggestion divided by the total number of times the one or more users submitted a search for queries beginning with text matching the first text input. The one or more users can be the first user. The one or more users can comprise multiple users.

Identifying the first dominant query can include identifying, from a user search history for the first user, one or more queries submitted by the first user that begin with text matching the first text input; and identifying the first dominant query from the one or more queries based on the first dominant query appearing in the user search history a number of times that satisfies a threshold. The text can match the first text input if the text is identical to the first text input. The text can match the first text input if the text is identical to the first text input, except for the use of stop words. The text can match the first text input if the text is identical to the first text input, except for differences in spelling. The text can match the first text input if the text is identical to the first text input, except that the text uses a synonym in place of a term in the first text input. The text can match the first text input if the text is identical to the first text input, except for word order. The text can match the first text input if the text is identical to the first text input, except for a combination of two or more of the foregoing exceptions. The threshold can be determined by multiplying a total number of times users submitted the one or more queries by a predefined factor.

Identifying the first dominant query can include identifying the first dominant query from a user search history for the first user based on the first dominant query appearing in the user search history a number of times that satisfies a threshold. Identifying the first dominant query can include analyzing a user search history for the first user to determine that the first user frequently submits queries that trigger answer boxes having a particular category; and identifying as the first dominant query a query that is associated with an answer box of the particular category.

Identifying the first dominant query can include determining that the first input is missing information needed to trigger an answer box; obtaining the needed information from user profile data for the first user; generating the first dominant query from the first text input and the needed information. The needed information can be a location of the first user. The needed information can be a language of the first user.

Identifying the first dominant query can include analyzing user profile data for the first user to determine that a particular category of answer box is relevant to the first user; and identifying as the first dominant query a query that is associated with an answer box of the particular category.

The method can further include, before selecting the first answer box, presenting a plurality of query suggestions to the first user and receiving data indicating that the first user has positioned a cursor over a selected query suggestion in the plurality of query suggestions; and identifying the selected query suggestion as the first dominant query. The method can further include receiving a plurality of query suggestions corresponding to the first text input. Presenting the first answer box can include presenting a display including the query suggestions and the first answer box.

Obtaining content for the first answer box can include accessing data associating triggering phrases with answer boxes; and obtaining content for the answer box associated with the dominant query in the data. The first answer box can be dynamic, and obtaining content for the first answer box can comprise obtaining updated content for the first answer box and formatting the updated content according to a template for the first answer box. The first answer box can be static, and obtaining content for the first answer box can comprise obtaining content for the static first answer box from a data store storing content for static answer boxes.

The method can further include, while receiving the first text input, and before the first user has submitted the user text input as a search request, identifying a second dominant query from the first text input, the second dominant query being different from the first dominant query; obtaining content for a second answer box associated with the second dominant query; and presenting the second answer box to the first user.

In general, another aspect of the subject matter described in this specification can be embodied in methods that include the actions of while receiving a user input entered in a search engine query input field by a user, and before the user has submitted the user input as a search request, accessing, in a data processing system, historical data, the historical data associating each of a plurality of input answer box pairs with a respective presentation value, each input answer box pair associating a text input with an answer box, where a text input is associated with an answer box if the answer box was presented by a search engine in response to a query beginning with an actual input matching the text input, and where the presentation value for each input-answer box pair is derived from a number of times the answer box in the pair was presented by the search engine in response to queries beginning with actual inputs matching the text input in the pair; identifying, in the data processing system and from the historical data, one or more candidate input answer box pairs, where the text input for each candidate pair matches the user input; selecting, by the data processing system, a pair from the one or more candidate pairs, where the pair is selected according to the presentation value for each candidate pair; obtaining content for the answer box in the selected pair; and presenting the answer box to the user. Other embodiments of this aspect include corresponding systems, apparatus, and computer programs recorded on computer storage devices, each configured to perform the operations of the methods.

These and other embodiments can each optionally include one or more of the following features. The presentation value for each input answer box pair can be the number of times the answer box in the pair was presented by the search engine in response to queries beginning with actual inputs matching the text input in the pair, divided by a total number of times queries beginning with actual inputs matching the text input in the pair were received by the search engine. The presentation value for each input answer box pair can be the number of times the answer box in the pair was presented by the search engine in response to queries beginning with actual inputs matching the text input in the pair, divided by a total number of times users submitted queries for one or more query suggestions for the text input in the pair.

The method can further include receiving, for each candidate input answer box pair, an indication of whether the candidate answer box in the pair was useful to users who submitted queries beginning with actual inputs matching the text input in the pair. Selecting the candidate answer box can be further based on the received indication.

The method can further include receiving a plurality of query suggestions for the user input. Presenting the answer box can include presenting a display including the query suggestions and the answer box.

The one or more users can be the user. The one or more users can comprise multiple users.

Particular embodiments of the subject matter described in this specification can be implemented so as to realize one or more of the following advantages. Relevant answer boxes can be identified before a user completes his or her search query. Users can be presented with a relevant summary of information without having to complete a search query. Users can be presented with answer boxes that answer a question the user has not yet asked. Users can be presented with a relevant summary of information in a useful format. Users can be presented with a relevant answer box along with other suggestions for completing their queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
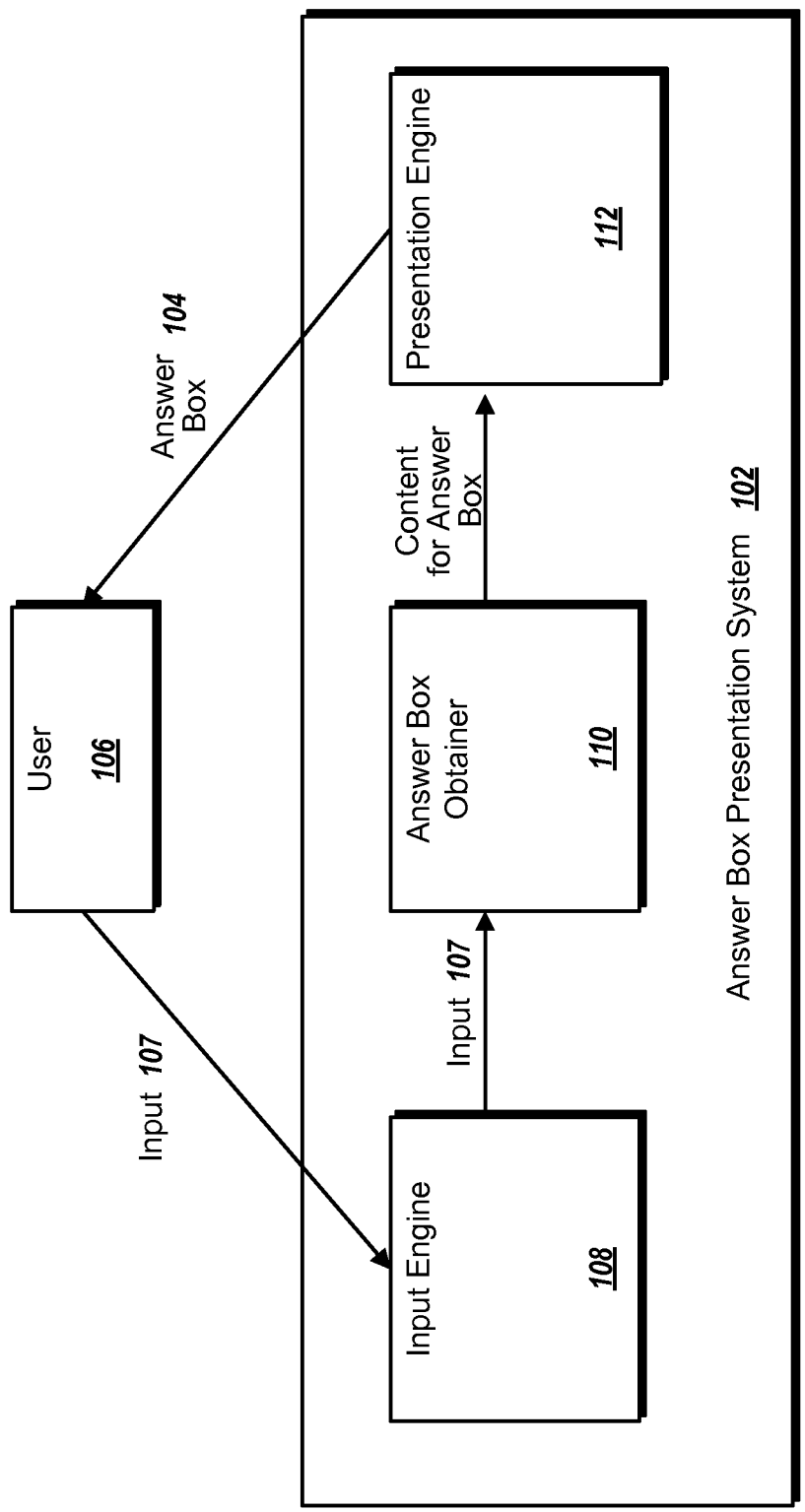
FIG. 1 illustrates an example answer box presentation system.

FIG. 1 illustrates an example answer box presentation system 102. The answer box presentation system 102 is part of a search engine system. The search engine system uses the answer box presentation system 102 to obtain content for an answer box 104, and then present the answer box 104 to a user 106. The answer box presentation system 102 does all of this while the user 106 enters text input 107, and before the user 106 submits a search request for the text input 107. The answer box presentation system 102 can select content and present the answer box 104 even when the input 107 does not match a specific, complete phrase associated with the answer box 104.

The user 106 interacts with the answer box presentation system 102, for example, through a search engine user interface presented on a user device. The search engine user interface can be a search web page or an application interface. Example user devices include computers and mobile devices. The search engine user interface includes a query input field where a user enters the text input 107, and a mechanism that the user can use to submit a search request. The query input field can be, for example, a field in a search engine web page, a field in a toolbar running in a web browser of the user, or a field in a search application running on the user device. The user 106 can use the mechanism to submit a search request for text input, for example, by pressing a search button in the search engine user interface, pressing the "enter" key in the query input field, or otherwise indicating that the user 106 has finished entering input and the search engine should identify search results responsive to the input in the query input field. The search engine user interface can further present information, for example, query suggestions, answer boxes, and search results, to the user 106.

The answer box presentation system 102 includes an input processor 108, an answer box obtainer 110, and a presentation engine 112. These software components can run on the user device or on one or more servers, for example, search engine servers, connected to the user device through a network.

The input processor 108 receives text input 107. For example, the text input 107 can be text input entered in a search engine query input field by the user 106, or the text input 107 can be text generated from voice input received from the user. The input processor 108 receives the input 107 and determines whether the input should be sent to the answer box obtainer 110. The input processor 108 can verify that the user 106 has not submitted a search request, e.g., that a user has not used the mechanism in the search user interface, or any other mechanism, to send input to the search engine indicating that the user has finished entering input and that the search engine should identify search results responsive to the input in the query input field. The input processor 108 can also consider other factors, for example, whether the text input has a minimum number of characters, or whether a predetermined amount of time has passed since the user 106 entered the last character of the text input 107.

Once the input processor 108 verifies that the input 107 should be sent to the answer box obtainer 110, the input processor 108 sends the input 107 to the answer box obtainer 110. The answer box obtainer 110 obtains content for an answer box 104 for the input 107. The answer box obtainer 110 is described in more detail below with reference to FIGS. 2 and 4.

The presentation engine 112 receives the content for the answer box 104 from the answer box obtainer 110 and presents it to the user 106, e.g., by sending data representing the answer box 104 to the user device for presentation in the search engine user interface. The presentation engine can send other data in addition to the selected answer box 104. For example, the presentation engine can receive a set of query suggestions, generate output comprising a list of query suggestions and the selected answer box 104, and send data representing this output to the user device for presentation to the user 106. The presentation engine 112 can receive the query suggestions from a query suggestion engine that generates query suggestions for the input 107, for example, using conventional techniques. The user device can present the suggestions and the answer box 104, for example, in a drop down menu that appears below the search engine query input field in the search engine user interface. The suggestions and the answer box 104 can be presented even if a user has not entered input indicating that the user wants the query suggestions or answer box 104 to be presented. The user device can alternatively use other configurations for presenting the output to the user 106. Example answer box presentations are described below, with reference to FIGS. 6A-6O.

Figure 2:
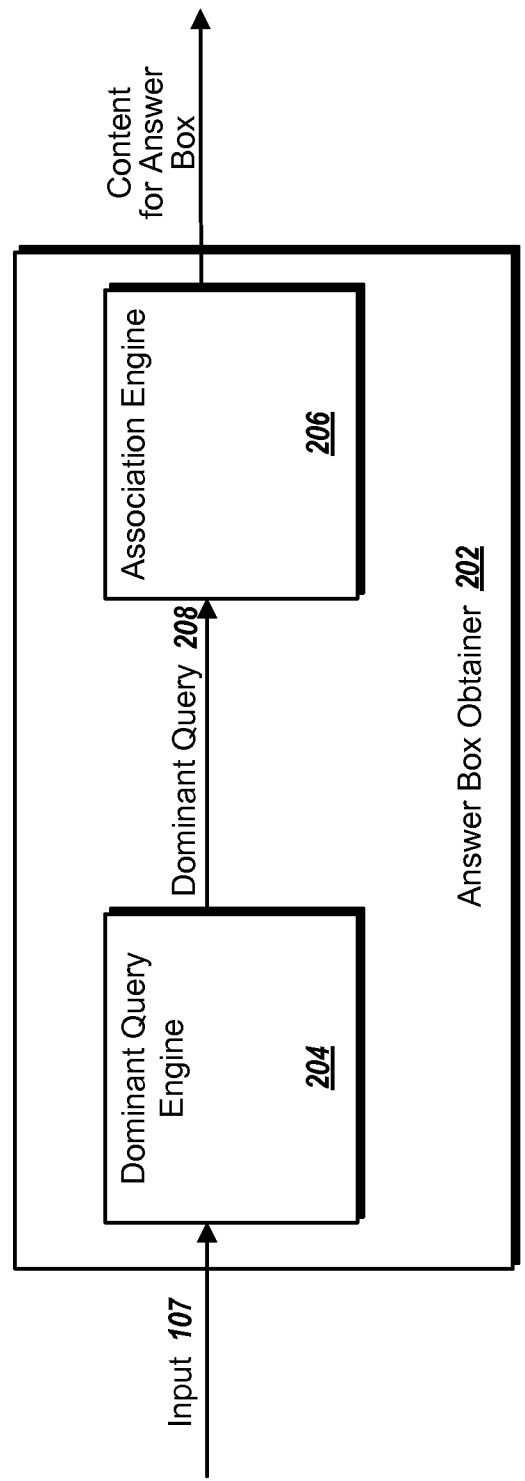
FIG. 2 illustrates an example selection engine.

FIG. 2 illustrates an example answer box obtainer 202. The example answer box obtainer 202 is an example of the answer box obtainer 110 described above with reference to FIG. 1.

The answer box obtainer 202 includes a dominant query engine 204 and an association engine 206. The answer box obtainer 202 derives a dominant query corresponding to the input 107 using the dominant query engine 204, and obtains content for an answer box 104 associated with the dominant query using the association engine 206. While the below examples describe deriving a single dominant query, multiple dominant queries for the input can be derived, and content for multiple answer boxes 104, each associated with one or more of the dominant queries 208, can be obtained.

The dominant query 208 is a query that corresponds to the input 107. The dominant query 208 can be the input 107 itself, or can be different from the input 107. The dominant query 208 can be a completion of the input 107. For example, if the input 107 is "weather San Fr," the dominant query 208 can be "weather San Francisco." The dominant query 208 can also be a modification of the input 107. For example, if the input 107 is "wetaher San Francisco," the dominant query 208 can be "weather San Francisco," thus correcting the misspelling of "weather." The dominant query 208 can also be both a modification and a completion of the input 107. For example, if the input 107 is "wetaher San Fr," the dominant query can be "weather San Francisco." The dominant query 208 can also be a query that is related to the input 107. For example, the dominant query 208 can be a query suggestion for the input 107. As another example, when the input matches a keyword or regular expression associated with a particular category of answer box, but does not contain enough information to trigger a specific answer box, the dominant query 208 can be the part of the input that matches the keyword or regular expression, plus a completion of the rest of the input 107. For example, if the input 107 is "weather San," and the keyword "weather" is associated with a weather answer box, the system can generate the dominant query 208 by combining the keyword "weather" with a completion of the rest of the input "San." The completion can be generated using the techniques for generating the dominant query that are described below.

The dominant query engine 204 can derive the dominant query 208 from the input 107 according to various heuristics. In some implementations, the dominant query is selected from a group of query suggestions for the input 107. The dominant query engine 204 can optionally add the input 107 to the group of query suggestions. The dominant query engine 204 receives the group of query suggestions and determines a popularity value for each query suggestion. The dominant query engine 204 receives the query suggestions from a query suggestion engine that generates query suggestions, for example, using conventional techniques.

The popularity value for a given query suggestion is derived from the number of times one or more users submit a search for the query suggestion. For example, the popularity value can be the number of times one or more users submit a search for the query suggestion divided by the total number of times the one or more users submit queries for each of the query suggestions, e.g.:

$$\text{popularity value (query } x) = \frac{\text{number of times users submit query } x}{\sum_i \text{number of times users submit query } i},$$

where query x is the query suggestion for which the popularity value is being calculated, and each query i is a query in the group of query suggestions. The one or more users can be, for example, just the user who entered the input 107, or a larger group of users.

Other formulas for determining the popularity value can also be used. For example, the dominant query engine 204 can optionally weight the number of times users submit each query by a measure of the quality of each query. The measure of quality can be derived, for example, from the number of times users select search results after issuing their queries, how long users view search results responsive to their queries, how often users refine their queries, and whether users interacted with other features of search result pages presented in response to their queries. As another example, the denominator in the popularity value can be a number of times queries that start with the input are submitted by users.

The dominant query engine 204 identifies the number of times users submit each query by analyzing user search history data. User search history data describes, for each user represented in the data, queries submitted by the user. The dominant query engine 204 analyzes the user search history data for the users and identifies the number of times the users submitted a query corresponding to each query suggestion. The user search history data can be anonymized for privacy protection. For example, the user search history can refer to users by only an Internet protocol (IP) address of a user device or can generate a unique random number that is associated with the IP address of the user device. Other anonymization processes, such as hashing, encryption and obfuscation techniques, can also be used to ensure that user privacy is protected. The user search history data can also be sanitized to remove suspect traffic. Suspect traffic can be, for example, traffic that has been identified as being generated by bots, traffic that has been identified as being spam, or repeat queries that are submitted by the same user in close succession to each other.

Once the dominant query engine 204 determines the popularity value for each query suggestion, the dominant query engine 204 selects the query suggestion having a popularity value that exceeds a threshold as the dominant query. Example thresholds include 50%, 66%, and 75%. The threshold can be determined empirically. For example, a threshold determination system can determine the appropriate threshold by testing a variety of thresholds and determining whether or not they result in a desired behavior of the system. The threshold determination system can determine whether the behavior of the system is the desired behavior, for example, by using human evaluators that explicitly indicate whether they found a presented answer box to be useful, or would have found an answer box to be useful. As another example, the system can measure the number of times users indirectly indicate that they found a presented answer box to be useful. Users can indirectly indicate that they found a presented answer box to be useful, for example, by selecting an answer box that is presented for the text input 107, spending a long time viewing an answer box, clicking on a link in an answer box, or not submitting any additional searches after being presented with the answer box.

The threshold determination system can make various modifications to the above approach. For example, the threshold determination system can determine thresholds for just ambiguous inputs and then apply the thresholds to less ambiguous inputs. Ambiguous inputs are inputs that can trigger several different dominant queries, for example, "weather San" which might trigger "weather San Jose," "weather San Francisco," "weather Santa Fe," etc. As another example, the threshold determination system can determine different thresholds for particular categories of answer boxes. The threshold determination system can select decreasingly lenient threshold scores for each category of answer boxes, until an acceptable threshold is found for each category. This allows the threshold determination system to make the thresholds as lenient as possible for each query.

In some implementations, the thresholds are user-specific. For example, if a user frequently triggers answer boxes of a particular category, or has profile data that indicates the user is interested in answer boxes of the particular category, the threshold can be more lenient for answer boxes of the particular category and the user. The thresholds can also be specific to categories of users, for example, users in the same location or users whose search histories indicate that they share search interests. Users' search histories can indicate that the users share search interests, for example, when the search histories have more than a threshold number of queries in common.

In other implementations, the answer box presentation system 102 presents query suggestions to the user after the user has entered the input 107, but before the user has submitted a search query. In these implementations, the dominant query 208 is the query in the group of query suggestions that a user indicates an interest in, for example, by placing a cursor such as a keyboard cursor or a mouse cursor over the query suggestion, without explicitly clicking on the query suggestion. In these implementations, the dominant query engine 204 receives input indicating that a user has indicated an interested in one of the query suggestions, and then identifies that query suggestion as the dominant query.

In still other implementations, the dominant query 208 is a query that appears the most often among queries issued by the user that begin with text that matches the input 107. In these implementations, the dominant query engine 204 analyzes user search history data for the user entering the input 107 to find one or more queries previously submitted by the user that begin with text that matches the input 107. Text matches the input 107 if the text is identical to the input 107, or differs from the input 107 in inconsequential ways, e.g., as determined by the search engine system. Text differs from the input 107 in inconsequential ways, for example, when the text and the input 107 are identical, except for the use of stop words, spelling, word order, or the substitution of synonyms. For example, if the input 107 is "weather San," or "wehather San" and the user had previously searched for "weather San Francisco," "weather San Jose," "the weather Santa Fe," and "weather Mountain View," the document query engine 204 identifies "weather San Francisco," "weather San Jose," and "the weather Santa Fe" as the queries. The dominant query engine 204 ignores "weather Mountain View" as it does not start with input similar to "weather San." The dominant query engine 204 then selects the query having a number of appearances that satisfies a threshold.

The threshold can be a predetermined number of appearances. Alternatively, the threshold can be determined from the total number of times the queries were submitted. For example, the threshold can be fifty-percent of the submitted queries. For example, if the user searched for "weather San Francisco" ten times, "weather San Jose" five times, and "the weather Santa Fe" one time, and the threshold is fifty-percent of the number of times the user searched for the queries, the threshold is eight. The dominant query engine 204 selects "weather San Francisco" as the dominant query, because it was submitted ten times, and ten is greater than the threshold of eight. The dominant query engine 204 can optionally weight the number of times each query appears by the amount of time since each query was submitted, with a lower weight given to older queries.

In other implementations, the dominant query 208 is a query that is frequently submitted by the user, regardless of the input 107. For example, the user can click on the query input field when the query field contains an empty text string as the input 107. The dominant query engine 204 can then analyze the user search history to identify the queries that the user submits the most frequently, and select one of them as the dominant query. For example, the dominant query engine 204 can select a query that appears at least a threshold number of times in the search history. The threshold can be determined empirically.

In other implementations, the dominant query 208 is the query that will trigger an answer box of a category that is frequently triggered by queries issued by the user. The dominant query engine 204 can determine that a given category of answer box is frequently triggered by the user, for example, when the percentage of queries submitted by the user that trigger answer boxes of the given category is larger by a threshold amount from the percentage of queries submitted by a larger group of users that trigger answer boxes of the given category. Alternatively, the dominant query engine 204 can look at a smaller group of queries, for example, queries sharing a pattern matched by the input. For example, when the input includes a city name, the dominant query engine 204 can compute the percentage of queries including a city name. In these implementations, the dominant query engine 204 analyzes user search history data for the user entering the input 107 to determine categories of answer boxes that would be triggered by previous queries submitted by the user. For example, if the user frequently searches for "weather" and various city names, the dominant query engine 204 identifies that the user frequently submits search queries that cause weather answer boxes to be presented. Therefore, if the input 107 is the city name "San Jose", the query engine 204 can identify the dominant query as "San Jose weather." As another example, if the user frequently submits queries that trigger financial answer boxes that provide financial information on various stocks, and the user enters input 107 identifying a stock, the dominant query engine 204 can identify the dominant query as "financial information" plus the name of the stock, or some other query that will similarly trigger a financial information answer box.

In still other implementations, the dominant query 208 is the query that best fits with user profile data. User profile data can be explicit data entered by a user and can include, for example, a user's location, language, time zone, and preferences. User profile data can also be implicit data that is determined as needed, for example, the location of the user that is determined by applying geolocation to the user's IP address. In these implementations, the dominant query engine 204 processes the input to determine whether the input is missing terms or characters that would trigger a particular category of answer box. If the input is missing terms or characters that would trigger a particular category of answer box, the dominant query engine 204 can use the profile data to generate a dominant query that includes the missing terms or characters.

In some implementations, the dominant query engine 204 processes the input to determine whether the input is likely missing a location. For example, if the input begins with "weath", the dominant query engine 204 can determine that the user might be requesting a weather answer box. The dominant query engine 204 can determine what queries are missing a location by matching keywords or regular expressions to the input. In such implementations, the dominant query engine 204 maintains a list of keywords or regular expressions that need place information in order to be associated with an answer box, determine when an input matches a keyword or regular expression but does not have a location, and then add in the location from user profile data for the user to the input.

In some implementations, the dominant query engine 204 analyzes a user profile to determine that the input is likely requesting an answer box of a particular category, and selects a dominant query that will trigger an answer box of the particular query. For example, if the input is a stock symbol, and the user's profile data includes data indicating that the user tracks several stocks, the dominant query engine 204 can determine that the user is interested in financial information and select a dominant query that will cause a financial information answer box for the stock to be presented. Alternatively, if the input is a stock symbol, and the user's profile data includes data indicating that the user tracks the stock identified in the input, the dominant query engine 204 can determine that the user is interested in the financial details for the particular stock, and therefore present the financial information. A user can track stocks, for example, by adding specific stock symbols to his or her profile, and then asking the system that manages the profile to provide the user with updates on the stocks.

Examples of other user profile information include movies that the user reviewed and the user's preferred language. For example, if a user had a movie review stored in his profile, a sequel of the movie was currently playing, and the user typed in "showtimes," the dominant query engine 204 could identify a dominant query that included the name of the sequel. As another example, if the user had entered a query that began with "translate" and had a phrase in a language different from the user's preferred language, the dominant query engine 204 could generate a dominant query requesting a translation of the phrase into the user's preferred language.

In other implementations, a combination of one or more of the heuristics and techniques described above can be used. For example, the dominant query engine 204 can selected the dominant query 208 from an analysis of query suggestions and user search history data for the user entering the input 107. The dominant query engine 204 can filter out query suggestions that do not appear more than a threshold number of times in the user search history data, or can adjust the popularity scores for the query suggestions described above by how frequently the query suggestions appear in the user search history data.

The association engine 206 receives the dominant query 208 and obtains content for an answer box associated with the dominant query 208. For example, the association engine 206 can maintain an answer box, triggering phrase database that associates answer boxes with the most common triggering phrases for the answer boxes. A triggering phrase for a given answer box is a search query that the answer box is presented in response to. The association engine 206 can determine the most common triggering phrases for each answer box, for example, by analyzing historical data describing how often answer boxes are triggered in response to various queries. The association engine 206 uses this database to select the answer box 104 by identifying a triggering phrase matching the dominant query 208 in the database, and then selecting the answer box associated with the triggering phrase in the database. The database can be updated as new queries trigger the answer boxes, and as new categories of answer boxes are created.

As another example, the association engine 206 can determine that the dominant query 208 matches a regular expression, or contains one or more keywords, associated with a particular answer box 104, and then select that answer box 104. In some implementations, the association engine 206 can require that both the dominant query 208 and the input 107 match a regular expression, or contain one or more keywords associated with a particular answer box 104. For example, if definitions answer boxes are associated with the pattern "define" followed by one or more words, the association engine 206 could require that the input 107 include the word "define" and that the dominant query 208 contain the word "define" followed by one or more words, before a definition answer box is selected for the dominant query 208. In some implementations, the association engine 206 can require that both the dominant query 208 and another query that was considered for the dominant query 208 be associated with the same answer box 104, before selecting the answer box 104. For example, if the dominant query 208 was selected from a group of query suggestions, the association engine 206 can determine that both the dominant query 208 and one of the other query suggestions are both associated with the answer box 104, before selecting the answer box 104.

If multiple dominant queries 208 are identified, the association engine 206 can select the answer box 104 that is most frequently associated with the dominant queries 208, or can select an answer box 104 for each dominant query 208.

Once the association engine 206 selects the answer box 104, the association engine 206 obtains content for the answer box 104. How the association engine 206 obtains content for the answer box is dependent on whether the answer box is static or dynamic. Static answer boxes are answer boxes whose content is predetermined. Static answer boxes are stored, for example, in a data storage storing answer boxes. In contrast, dynamic answer boxes are answer boxes whose content is obtained as needed. Some answer boxes can be static at some points in time, and dynamic at other points in time. For example, the content in an answer box can be updated according to a regular schedule. When the content needs to be updated, the answer box is a dynamic answer box. However, once the content is updated, the content is cached and the answer box is a static answer box, until the time for the next update.

The association engine 206 obtains content for static answer boxes from the data storage where content for static answer boxes is stored.

When the association engine 206 is obtaining content for a dynamic answer box, the association engine 206 obtains content responsive to the category and the parameter of the answer box, for example, according to rules associated with the category of the answer box 104. The association engine 206 can obtain the content from a backend server that manages data for the category of the answer box 104. Alternatively, the association engine can receive the content from a cache that caches content for recently obtained answer boxes. Once the association engine 206 obtains the content, the association engine 206 formats the content according to a template associated with the category of the answer box 104.

Figure 3:
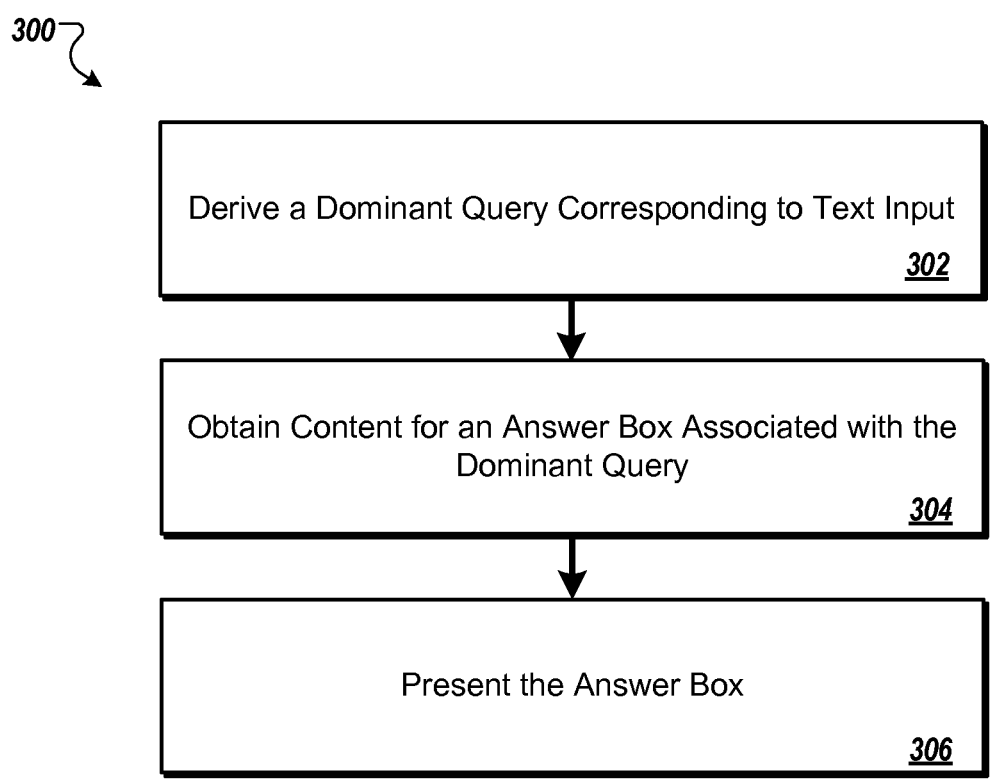
FIG. 3 illustrates an example method for obtaining content for an answer box and presenting the answer box to a user.

FIG. 3 illustrates an example method 300 for obtaining content for an answer box and presenting the answer box to a user. For convenience, the method will be described with reference to a system that performs the method 300. The system can be, for example, the answer box presentation system 102 described above with reference to FIG. 1, including selection engine 202 described above with reference to FIG. 2.

The method is performed while the system receives text input entered in a search engine query input field, and before the user submits a search request for the text input. The input can be received, for example, as described above with reference to FIG. 1. The system derives a dominant query corresponding to the text input (302), for example, as described above with reference to FIG. 2. The system obtains content for an answer box associated with the dominant query (304), for example, as described above with reference to FIG. 2. The system presents the answer box (306), for example, as described above with reference to FIG. 1.

In some implementations, the system presents the answer box along with query suggestions for the user input. In these implementations, the system can select the location of the answer box relative to the query suggestions. In some implementations, the system always presents the answer box in a default location, for example, before all of the query suggestions, after all of the query suggestions, or next to the dominant query corresponding to the answer box. In some implementations, the default placement is specific to the category of answer box or specific to the dominant query. For example, some categories of answer boxes can always appear at the end of the query suggestions.

In other implementations, the system selects a location for the answer box according to a relative confidence in the answer box relative to the query suggestions. The system can determine a confidence score for the answer box, for example, from the popularity score of the dominant query associated with the answer box, or from other factors. The system can determine a confidence score for the query suggestions, for example, from an analysis of user search history data that indicates how often each query is submitted, how often users select the query suggestion when it is presented as a query suggestion, or how often users click on search results presented in response to the query suggestion.

In other implementations, the system alternatively, or additionally, selects the location for the answer box based on how visually prominent or distracting the answer box is. For example, more visually prominent or distracting answer boxes can be placed below the query suggestions. Visually prominent or distracting categories of answer boxes, or individual answer boxes, can be determined in advance, for example, using empirical evaluation. The system can store data identifying which answer boxes are visually prominent or distracting, and access this data when needed.

Figure 4:
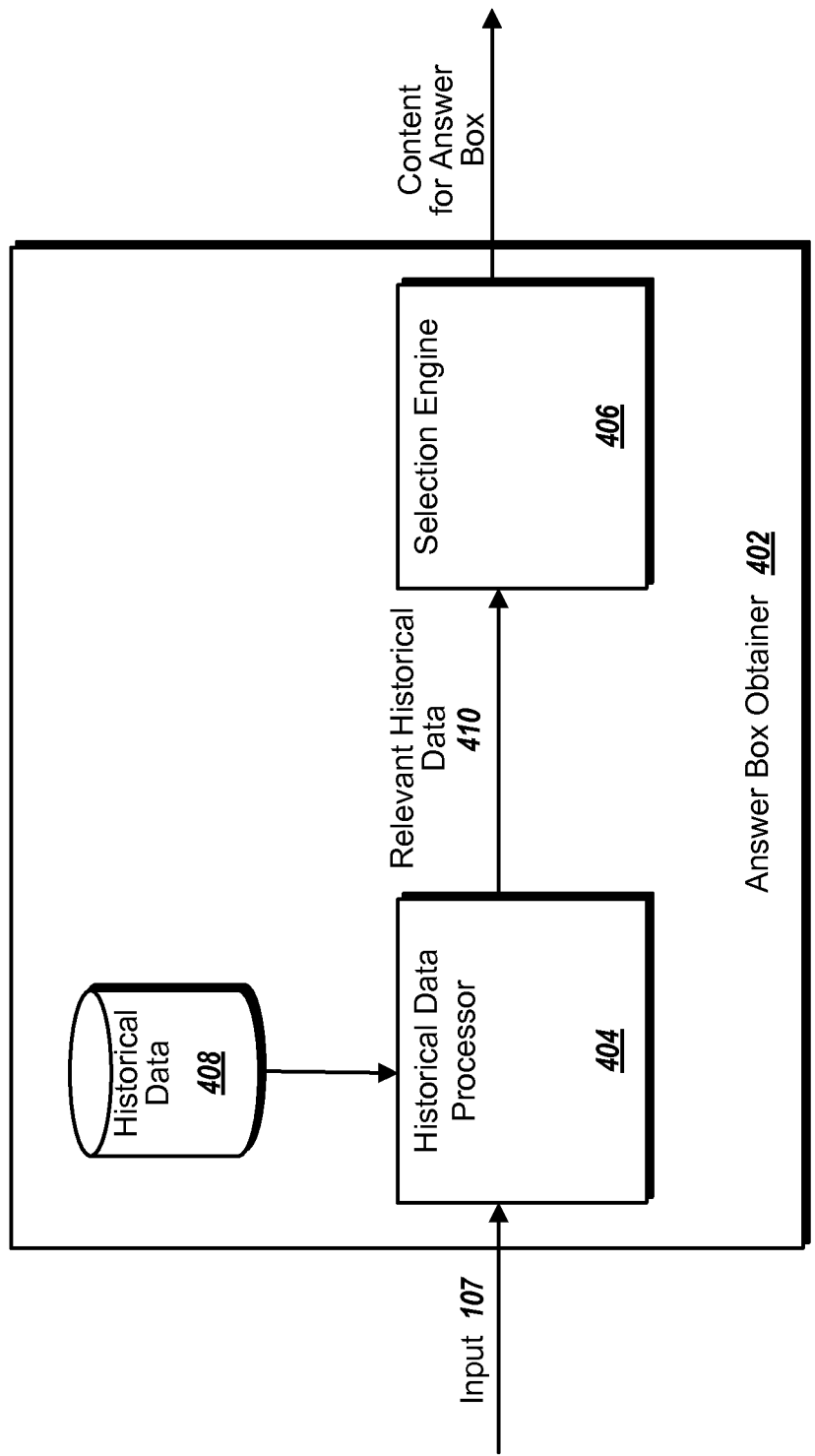
FIG. 4 illustrates another example selection engine.

FIG. 4 illustrates another example answer box obtainer 402. The answer box obtainer 402 is another example of the answer box obtainer 110 described above with reference to FIG. 1. The answer box obtainer 402 includes a historical data processor 404 and a selection engine 406. Unlike the answer box obtainer 202 described above with reference to FIG. 2, the answer box obtainer 402 obtains content for the answer box 104 without identifying a dominant query. Instead, the answer box obtainer 402 obtains content for the answer box 104 according to an analysis of historical data 408.

The historical data 408 associates input-answer box pairs with a presentation value for each pair. Each input-answer box pair associates a text input with an answer box. An answer box is associated with a text input if the answer box was presented by a search engine in response to a query beginning with an actual input matching the text input. A query can begin with an actual input, for example, when the query is the actual input, or when the query is a completion of the actual input. For example, if the actual input is "weather San Fr," example queries beginning with the actual input include "weather San Francisco" and "weather San." The answer box can be presented to the users along with search results for the query input, or can be presented before the query is submitted, for example, along with query suggestions for the query, as described above with reference to FIG. 1.

The presentation value for a given input-answer box pair is derived from the number of times the answer box in the pair was presented by a search engine in response to users entering completions of actual input matching the text input of the pair. The presentation value can be the count of the number of times each answer box is presented. For example, the historical data 408 could indicate that users who entered a query beginning with text matching "weather San," were presented with an answer box showing the weather in San Francisco fifty five times, an answer box showing the weather in San Jose seventy-eight times, and an answer box showing the weather in Santa Fe ninety-five times. The presentation value can also be scaled, for example, by the total number of times users entered queries beginning with actual input matching the text input in the pair, or the total number of times users entered a query matching a query suggestion for the text input in the pair. Alternatively or additionally, the presentation value for an input-answer box pair can be increased when the answer box in the pair was presented in response to queries that are a completion of actual input matching the text input in the pair and/or decreased when the answer box in the pair was presented in response to queries that are the actual input matching the text input in the pair. This weighting allows the historical data processor 410 to give preference to input-answer box pairs corresponding to query completions. The presentation value for an input-answer box pair can also be increased when the answer box in the pair was presented along with search results for a query, and decreased when the answer box in the pair was presented along with query suggestions for a query. This weighting allows the historical data processor 410 to give preference to answer boxes presented after a user submitted a search for a query.

The historical data 408 can optionally be divided by various categorizations of users. Example categories include a geographic location of users, language preference of users, and demographic information of users. Geographic location of users can include, for example, a city, metropolitan region, state, country, or continent. Language preferences of users can include preferences specified by the users in a profile, language preferences specified in a web browser on the client device of the user, or language preferences determined from user search behavior, for example, the language of the queries issued by the user. Demographic information can include age and sex of users. The historical data 408 can also be divided, for example, by individual users.

The historical data 408 can optionally include an indication, for each input-answer box pair, of how useful the answer box in the pair is to users who enter a query beginning with actual input matching the text input in the pair. Indications of usefulness can include, for example, that users viewed an answer box for a long period of time or that many users clicked on links in an answer box. Indications of usefulness can also include, for example, that users frequently hover a mouse cursor near an answer box, that users do not generally refine their queries after an answer box is presented, and that users often do not click on other search results or query suggestions presented along with an answer box.

The historical data processor 404 receives the historical data 408 and the input 107 and identifies the relevant historical data 410 for the input 107. The relevant historical data 410 is historical data for input-answer box pairs having an input that matches the input 107. When the user search history data is categorized as described above, the relevant historical data 410 can be data for users in a same category as the user entering the input 107. The relevant historical data 410 can alternatively be data for just the user entering the input 107.

The selection engine 406 receives the relevant historical data 410 and selects an input-answer box pair according to the presentation value for each input-answer box pair. For example, the selection engine 406 can select the input-answer box pair having the largest presentation value. In some implementations, when the historical data 408 includes an indication of how useful the answer box in each pair is to users who enter a completion of actual input matching the text input in the pair, the selection engine 406 can further select the input-answer box pair according to this usefulness indication. For example, the selection engine 406 can generate a score for each input-answer box pair by combining the presentation value and the usefulness indication, for example, by summing or multiplying the two values, and then selecting the input-answer box pair with the highest score. The selection engine 406 can also filter out input-answer box pairs that fail to satisfy a usefulness threshold, and then select from the remaining input-answer box pairs according to their respective presentation values. The usefulness threshold is a threshold for the usefulness indication and can be empirically determined.

Once the selection engine 406 selects an input-answer box pair, the selection engine 406 then obtains content for the answer box in the selected input-answer box pair, for example, as described above with reference to FIG. 2.

Figure 5:
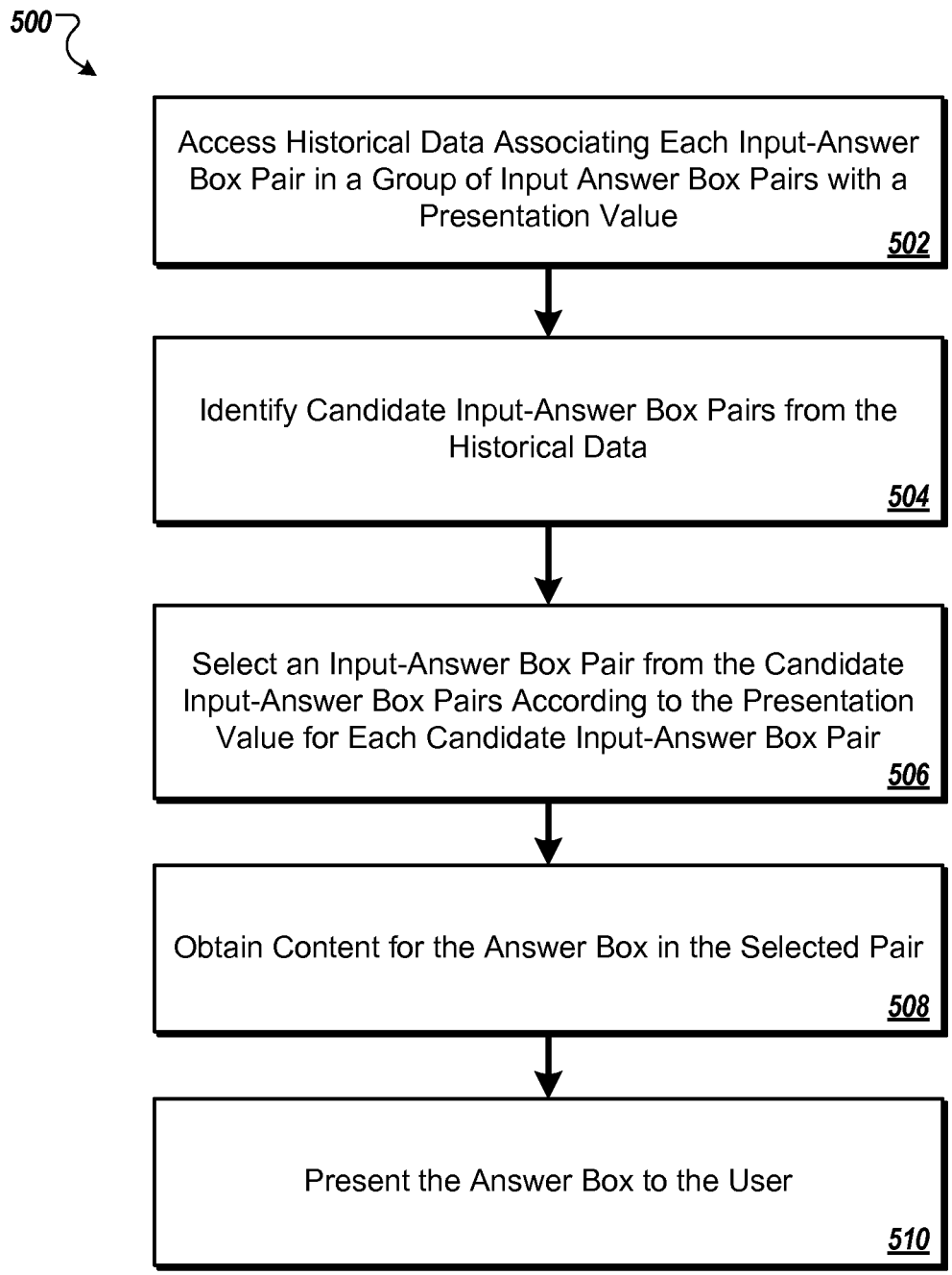
FIG. 5 illustrates another example method for obtaining content for an answer box and presenting the answer box to a user.

FIG. 5 illustrates another example method 500 for obtaining content for an answer box and presenting the answer box to a user. For convenience, the method will be described with reference to a system that performs the method 500. The system can be, for example, the answer box presentation system 102 described above with reference to FIG. 1, including selection engine 402 described above with reference to FIG. 4.

The method is performed while the system receives text input entered in a search engine query input field, and before the user submits a search request for the text input. The input can be received, for example, as described above with reference to FIG. 1. The system accesses historical data associating each input-answer box pair in a group of input-answer box pairs with a presentation value (502), for example, as described above with reference to FIG. 4. The system identifies candidate input-answer box pairs from the historical data (504), for example, as described above with reference to FIG. 4. The system selects an input-answer box pair from the candidate input-answer box pairs according to the presentation value for each candidate input-answer box pair (506), for example, as described above with reference to FIG. 4. The system obtains content for the answer box in the selected pair (508), for example, as described above with reference to FIG. 4. The system presents the answer box to the user (510), for example, as described above with reference to FIG. 1.

In some implementations, the system uses the method 500 to verify that an answer box selected according to the method 300 is the best answer box for the query, for example, by verifying that both methods select the same answer box.

Figure 6A:
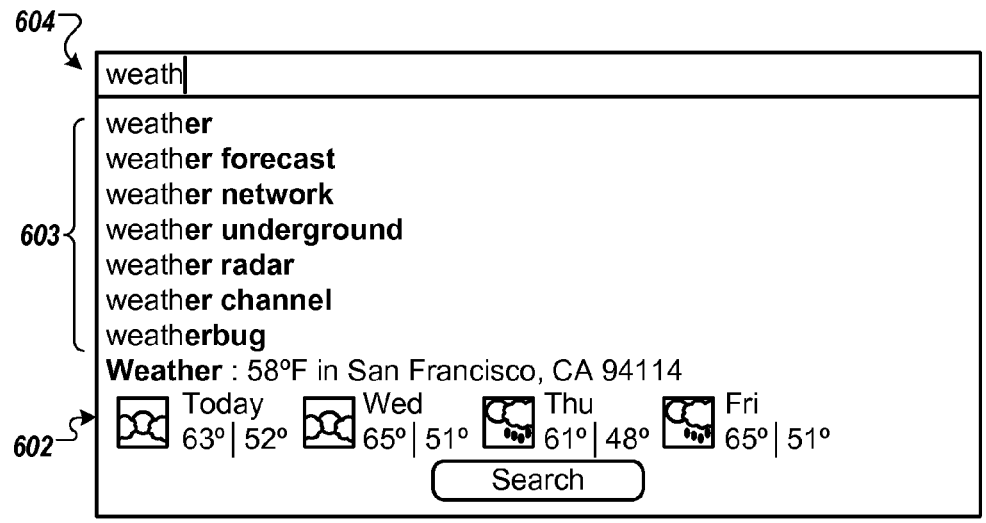
FIGS. 6A-6O illustrate example answer boxes presented in response to unsubmitted text input entered by a user, before a user has submitted a search request.

FIGS. 6A-6O illustrate example answer boxes presented in response to unsubmitted text input entered by a user. Content for the example answer boxes can be obtained and the example answer boxes can be presented, for example, using the techniques described above.

FIG. 6A illustrates an example weather answer box 602 presented along with query suggestions 603 for the input "weath" 604. The weather answer box 602 presents a summary of weather information for San Francisco based on location information in user profile data for the user.

Figure 6B:
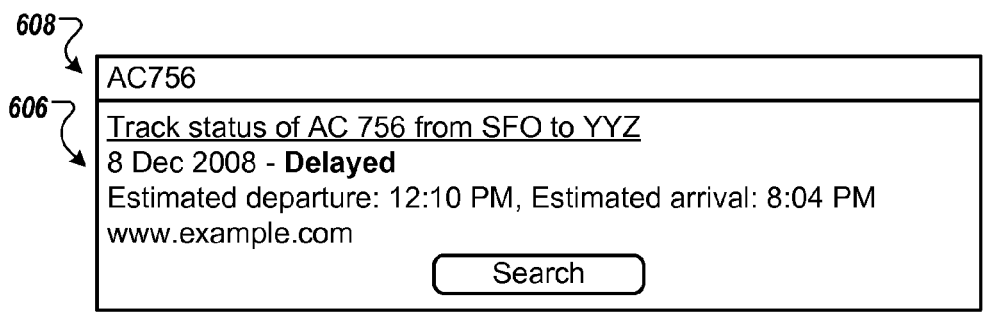

FIG. 6B illustrates an example flight tracking answer box 606 presented in response to a user entering the input "AC756" 608. The flight tracking answer box 606 presents a summary of a particular leg of the flight specified by the user.

Figure 6C:
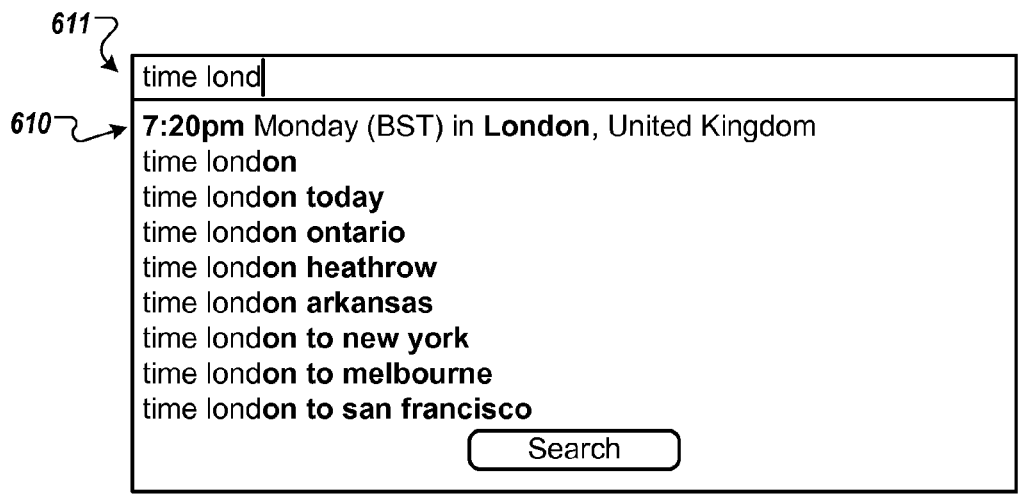

FIG. 6C illustrates an example time conversion answer box 610 presented in response to a user entering the input "time lond" 611. The time conversion answer box 610 presents the current time in London, United Kingdom, even though the input 611 only identifies the first few characters of the city's name.

Figure 6D:
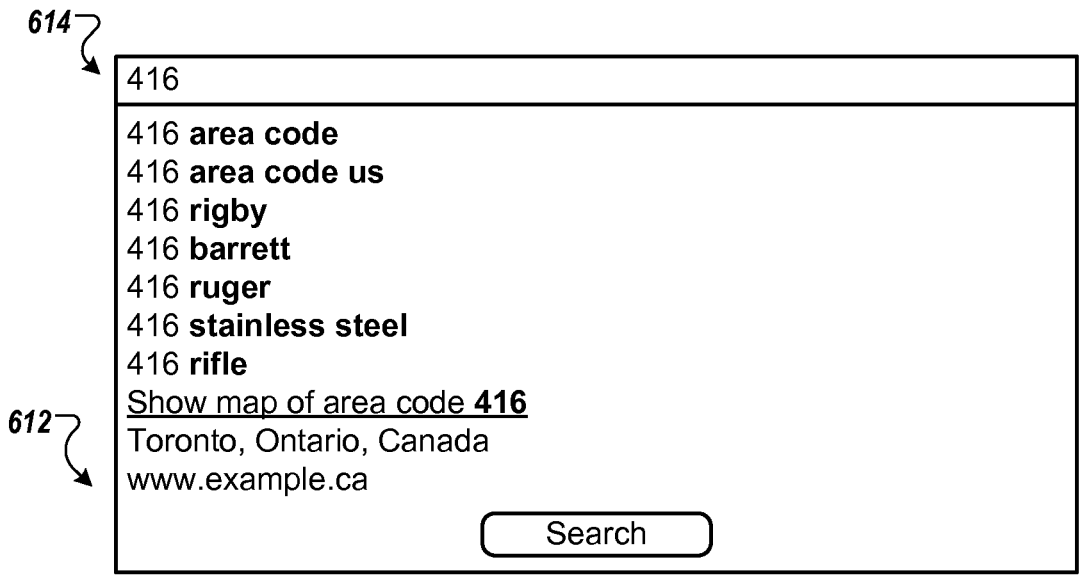

FIG. 6D illustrates an example location answer box 612 presented in response to a user entering the input "416" 614. The location answer box 612 provides location details for the area code 416, for example, that it is the area code for Toronto, Ontario, Canada. The location answer box 612 also includes a link to a map of the area corresponding to the area code 416.

Figure 6E:

FIG. 6E illustrates an example currency conversion answer box 616 presented in response to a user entering the input "usd to au" 618. The currency conversion answer box 616 presents the current conversion rate from United States dollars to Australian dollars, even though the input 618 does not fully identify Australian dollars.

Figure 6F:
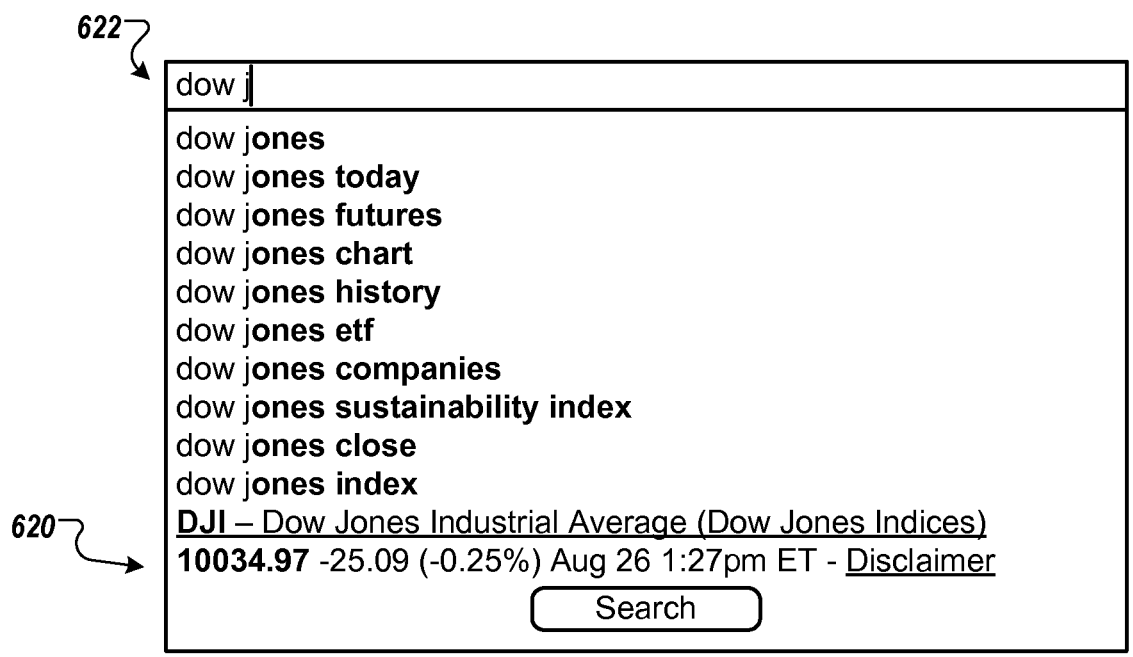

FIG. 6F illustrates an example stock information answer box 620 presented in response to a user entering the input "dow j" 622. The stock information answer box 620 presents a summary of the details for the stock index having a ticker symbol "dji", and includes a link to a webpage with more information about the stock index.

Figure 6G:
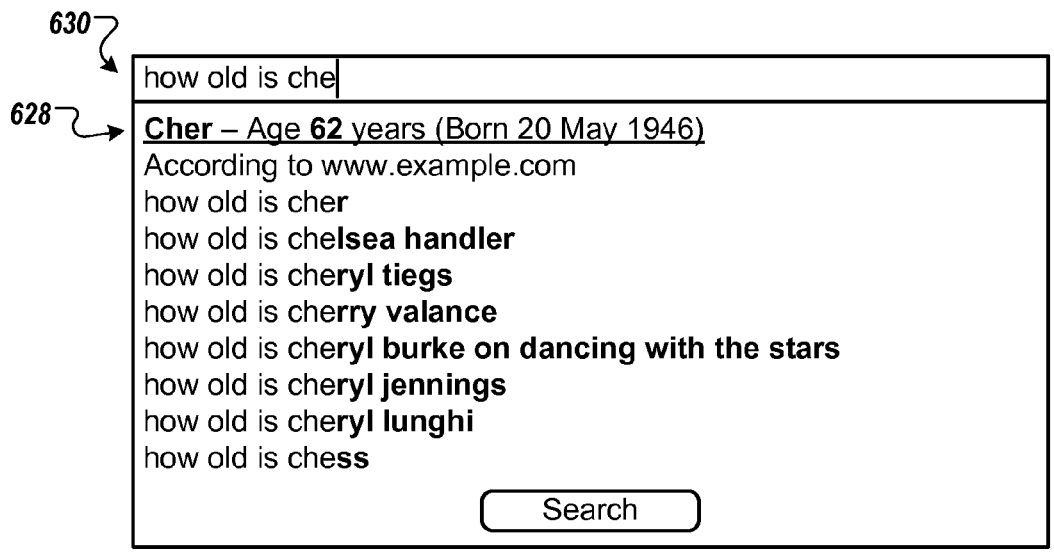

FIG. 6G illustrates an example answer box 628 presented in response to a user entering the input "how old is che" 630. The answer box 628 presents Cher's age and birthdate.

Figure 6H:
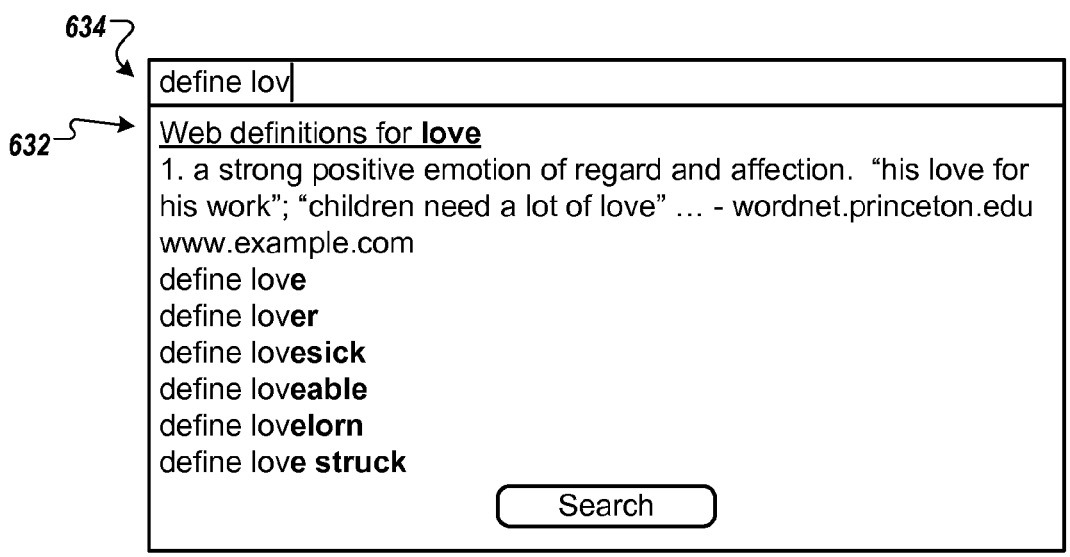

FIG. 6H illustrates an example definition answer box 632 presented in response to a user entering the input "define lov" 634. The definition answer box 632 presents different definitions for love.

Figure 6I:
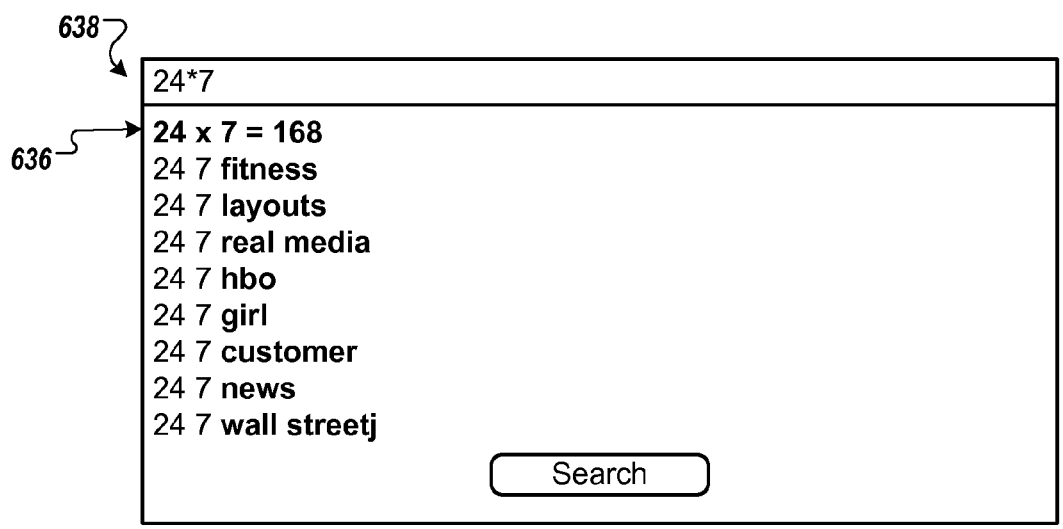

FIG. 6I illustrates an example calculation answer box 636 presented in response to a user entering the input "24*7" 638. The calculation answer box 638 presents the result of performing the multiplication entered by the user.

Figure 6J:
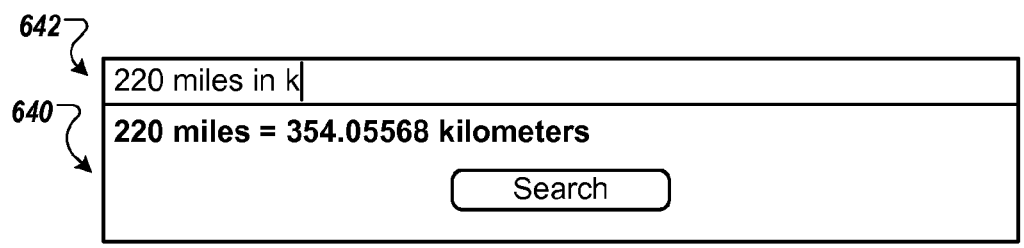

FIG. 6J illustrates an example conversion answer box 640 presented in response to a user entering the input "220 miles in k" 642. The example conversion answer box 640 presents the result of the conversion of 220 miles into kilometers.

FIG. 6K illustrates an example movie showtime answer box 644 for the movie Slumdog Millionaire, presented in response to a user entering the input "slumd" 646. The movie showtime box 644 lists showtimes for the location of the user stored in the user's profile.

FIG. 6L illustrates an example movie showtime answer box 648 for San Francisco, presented in response to a user entering the input "amc merc" 650. The showtimes are for a location of the user.

Figure 6M:
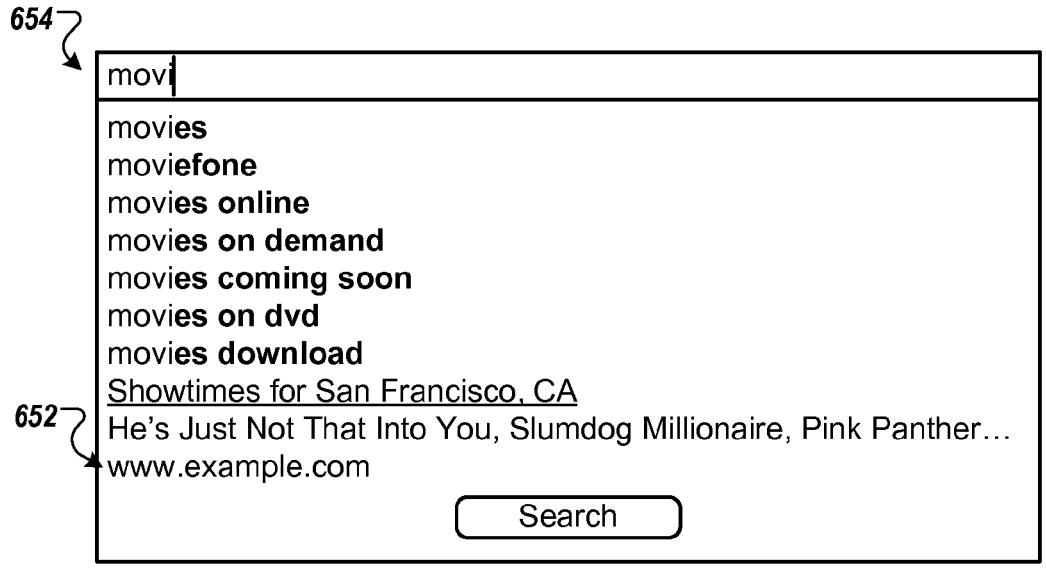

FIG. 6M illustrates an example movie showtime answer box 652 for San Francisco, presented in response to a user entering the input "movi" 654.

Figure 6N:
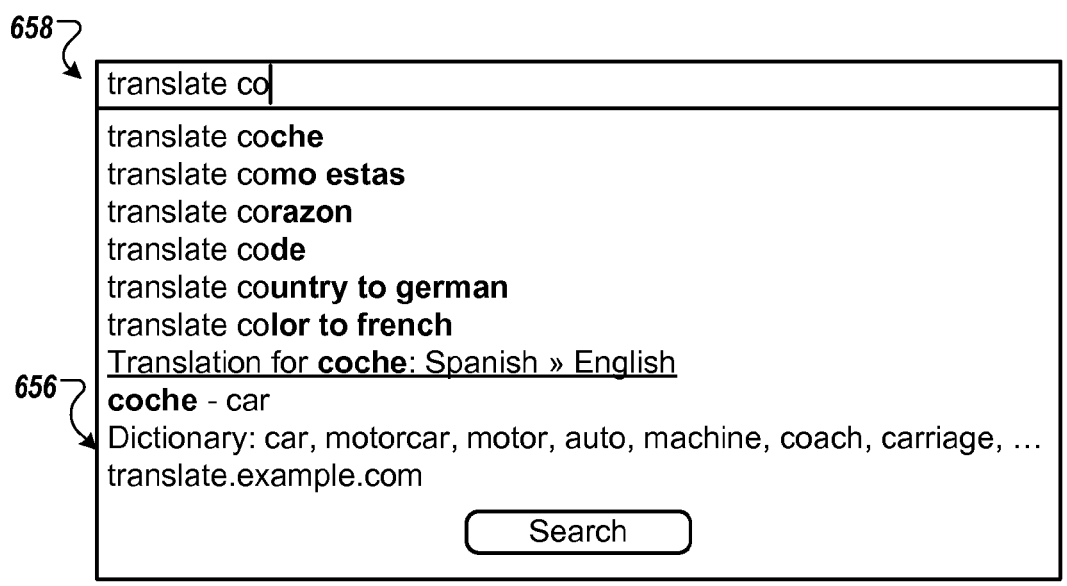

FIG. 6N illustrates an example translation answer box 656 showing a translation of "coche" from Spanish into English. The translation answer box 656 is presented in response to the user entering the input "co" 658.

FIG. 6O illustrates an example sports statistics answer box 660 providing details on the Boston Red Sox. The sports statistics answer box 660 is presented in response to the user entering the input "red so" 662.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a mobile device, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, answer boxes can be manually associated with text input, for example, in a database, and an answer box can be selected for unsubmitted text input according to the associations in the database. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   while receiving a first text input entered in a search engine query input field by a first user, and before the first user has submitted the first text input as a search request:
      deriving, in a data processing system, a first dominant query from the first text input, wherein deriving the first dominant query includes:
         determining that the first text input is missing information needed to trigger an answer box;
         obtaining the needed information from user profile data for the first user, including analyzing the user profile data for the first user to determine that a particular category of answer box is relevant to the first user; and
         generating the first dominant query from the first text input, the needed information, and the particular category of answer box;
      obtaining, by the system, content for a first answer box associated with the first dominant query; and
      presenting the first answer box to the first user.

2. The method of claim 1, wherein the first dominant query is different from the first text input.

3. The method of claim 1, wherein generating the first dominant query includes:
   receiving a group of queries including one or more query suggestions for the first text input;
   determining a popularity value for each query in the group of queries, the popularity value for each query being derived from a number of times one or more users submitted the query suggestion; and
   identifying a selected query from the one or more queries as the first dominant query, the selected query having a popularity value that exceeds a threshold.

4. The method of claim 3, wherein the group of queries further includes the first text input.

5. The method of claim 3, wherein the popularity value for each query is a number of times one or more users submitted a search for the query suggestion divided by the total number of times the one or more users submitted a search for each query suggestion in the plurality of query suggestions.

6. The method of claim 3, wherein the popularity value for each query is the number of times one or more users submitted a search for the query suggestion divided by the total number of times the one or more users submitted a search for queries beginning with text matching the first text input.

7. The method of claim 1, wherein generating the first dominant query includes: identifying, from a user search history for the first user, one or more queries submitted by the first user that begin with text matching the first text input; and
identifying the first dominant query from the one or more queries based on the first dominant query appearing in the user search history a number of times that satisfies a threshold.

8. The method of claim 7, wherein the text matches the first text input if the text is identical to the first text input.

9. The method of claim 7, wherein the text matches the first text input if the text is identical to the first text input, except for the use of stop words, except for differences in spelling, except that the text uses a synonym in place of a term in the first text input, except for word order, or except for a combination of two or more of the foregoing exceptions.

10. The method of claim 7, wherein the threshold is determined by multiplying a total number of times users submitted the one or more queries by a predefined factor.

11. The method of claim 1, wherein generating the first dominant query includes identifying the first dominant query from a user search history for the first user based on the first dominant query appearing in the user search history a number of times that satisfies a threshold.

12. The method of claim 1, wherein:
analyzing user profile data for the first user to determine that a particular category of answer box is relevant to the first user comprises analyzing a user search history for the first user to determine that the first user frequently submits queries that trigger answer boxes having a particular category.

13. The method of claim 1, wherein the needed information is a location of the first user or a language of the first user.

14. The method of claim 1, further comprising:
before selecting the first answer box, presenting a plurality of query suggestions to the first user and receiving data indicating that the first user has positioned a cursor over a selected query suggestion in the plurality of query suggestions; and
identifying the selected query suggestion as the first dominant query.

15. The method of claim 1, further comprising receiving a plurality of query suggestions corresponding to the first text input; wherein:
presenting the first answer box includes presenting a display including the query suggestions and the first answer box.

16. The method of claim 1, wherein obtaining content for the first answer box includes:
accessing data associating triggering phrases with answer boxes; and
obtaining content for the answer box associated with the dominant query in the data.

17. The method of claim 1, wherein:
the first answer box is dynamic; and
obtaining content for the first answer box comprises obtaining updated content for the first answer box and formatting the updated content according to a template for the first answer box.

18. The method of claim 1, wherein:
the first answer box is static; and
obtaining content for the first answer box comprises obtaining content for the static first answer box from a data store storing content for static answer boxes.

19. A system comprising:
one or more computers and one or more storage devices storing instructions that are operable, when executed by the one or more computers, to cause the one or more computers to perform operations comprising:
while receiving a first text input entered in a search engine query input field by a first user, and before the first user has submitted the first text input as a search request:
deriving, in a data processing system, a first dominant query from the first text input, wherein deriving the first dominant query includes:
determining that the first text input is missing information needed to trigger an answer box;
obtaining the needed information from user profile data for the first user, including analyzing the user profile data for the first user to determine that a particular category of answer box is relevant to the first user; and
generating the first dominant query from the first text input, the needed information, and the particular category of answer box;
obtaining, by the system, content for a first answer box associated with the first dominant query; and
presenting the first answer box to the first user.

20. The system of claim 19, wherein generating the first dominant query includes:
receiving a group of queries including one or more query suggestions for the first text input;
determining a popularity value for each query in the group of queries, the popularity value for each query being derived from a number of times one or more users submitted the query suggestion; and
identifying a selected query from the one or more queries as the first dominant query, the selected query having a popularity value that exceeds a threshold.

21. The system of claim 20, wherein the group of queries further includes the first text input.

22. The system of claim 20, wherein the popularity value for each query is a number of times one or more users submitted a search for the query suggestion divided by the total number of times the one or more users submitted a search for each query suggestion in the plurality of query suggestions.

23. The system of claim 20, wherein the popularity value for each query is the number of times one or more users submitted a search for the query suggestion divided by the total number of times the one or more users submitted a search for queries beginning with text matching the first text input.

24. The system of claim 19, wherein generating the first dominant query includes:
identifying, from a user search history for the first user, one or more queries submitted by the first user that begin with text matching the first text input; and
identifying the first dominant query from the one or more queries based on the first dominant query appearing in the user search history a number of times that satisfies a threshold.

25. A non-transitory computer-readable medium storing software comprising instructions executable by one or more computers which, upon such execution, cause the one or more computers to perform operations comprising:
while receiving a first text input entered in a search engine query input field by a first user, and before the first user has submitted the first text input as a search request:

deriving, in a data processing system, a first dominant query from the first text input, wherein deriving the first dominant query includes:
   determining that the first text input is missing information needed to trigger an answer box;
   obtaining the needed information from user profile data for the first user, including analyzing the user profile data for the first user to determine that a particular category of answer box is relevant to the first user; and
   generating the first dominant query from the first text input, the needed information, and the particular category of answer box;
obtaining, by the system, content for a first answer box associated with the first dominant query; and
presenting the first answer box to the first user.

26. The computer-readable medium of claim 25, wherein generating the first dominant query includes:
   receiving a group of queries including one or more query suggestions for the first text input;
   determining a popularity value for each query in the group of queries, the popularity value for each query being derived from a number of times one or more users submitted the query suggestion; and
   identifying a selected query from the one or more queries as the first dominant query, the selected query having a popularity value that exceeds a threshold.

27. The computer-readable medium of claim 26, wherein the group of queries further includes the first text input.

28. The computer-readable medium of claim 26, wherein the popularity value for each query is a number of times one or more users submitted a search for the query suggestion divided by the total number of times the one or more users submitted a search for each query suggestion in the plurality of query suggestions.

29. The computer-readable medium of claim 26, wherein the popularity value for each query is the number of times one or more users submitted a search for the query suggestion divided by the total number of times the one or more users submitted a search for queries beginning with text matching the first text input.

30. The computer-readable medium of claim 25, wherein generating the first dominant query includes:
   identifying, from a user search history for the first user, one or more queries submitted by the first user that begin with text matching the first text input; and
   identifying the first dominant query from the one or more queries based on the first dominant query appearing in the user search history a number of times that satisfies a threshold.

* * * * *